United States Patent
Eggert, Jr. et al.

[15] 3,647,168
[45] Mar. 7, 1972

[54] EJECTION SEAT ARRANGEMENT

[72] Inventors: Walter S. Eggert, Jr., Huntingdon Valley; Michael S. Frankel, Cheltenham, both of Pa.

[73] Assignee: The Budd Company, Philadelphia, Pa.

[22] Filed: Apr. 27, 1970

[21] Appl. No.: 31,898

[52] U.S. Cl. ..................................244/122 A, 297/248
[51] Int. Cl. ........................................................B64d 25/10
[58] Field of Search..........244/122, 122 A, 122 AB, 122 AC, 244/122 AD, 122 AE, 122 AF, 122 AG, 122 AH; 297/216, 232, 248, 452

[56] References Cited

UNITED STATES PATENTS

| | | | |
|---|---|---|---|
| 2,945,654 | 7/1960 | Woodward et al. | 244/122 A |
| 3,079,111 | 2/1963 | Thorp | 244/122 AD |
| 3,214,117 | 10/1965 | James et al. | 244/122 A |
| 3,387,803 | 6/1968 | Bradfield et al. | 244/122 |
| 3,468,582 | 9/1969 | Judd | 297/248 X |

Primary Examiner—Milton Buchler
Assistant Examiner—Carl A. Rutledge
Attorney—Thomas I. Davenport, Edward M. Farrell, John B. Sowell, Alford L. Trueax, Jr. and William R. Nolte

[57] ABSTRACT

A lightweight ejection seat includes a main body having a honeycomb core sandwiched between two formed sheets of metal. A track and rail arrangement is used to control the direction of seat ejection. Means are provided to permit the seat to tilt prior to the separation of the seat from the vehicle.

6 Claims, 7 Drawing Figures

INVENTORS
WALTER S. EGGERT, JR.
BY MICHAEL S. FRANKEL

Edward M. Farrell

ATTORNEY

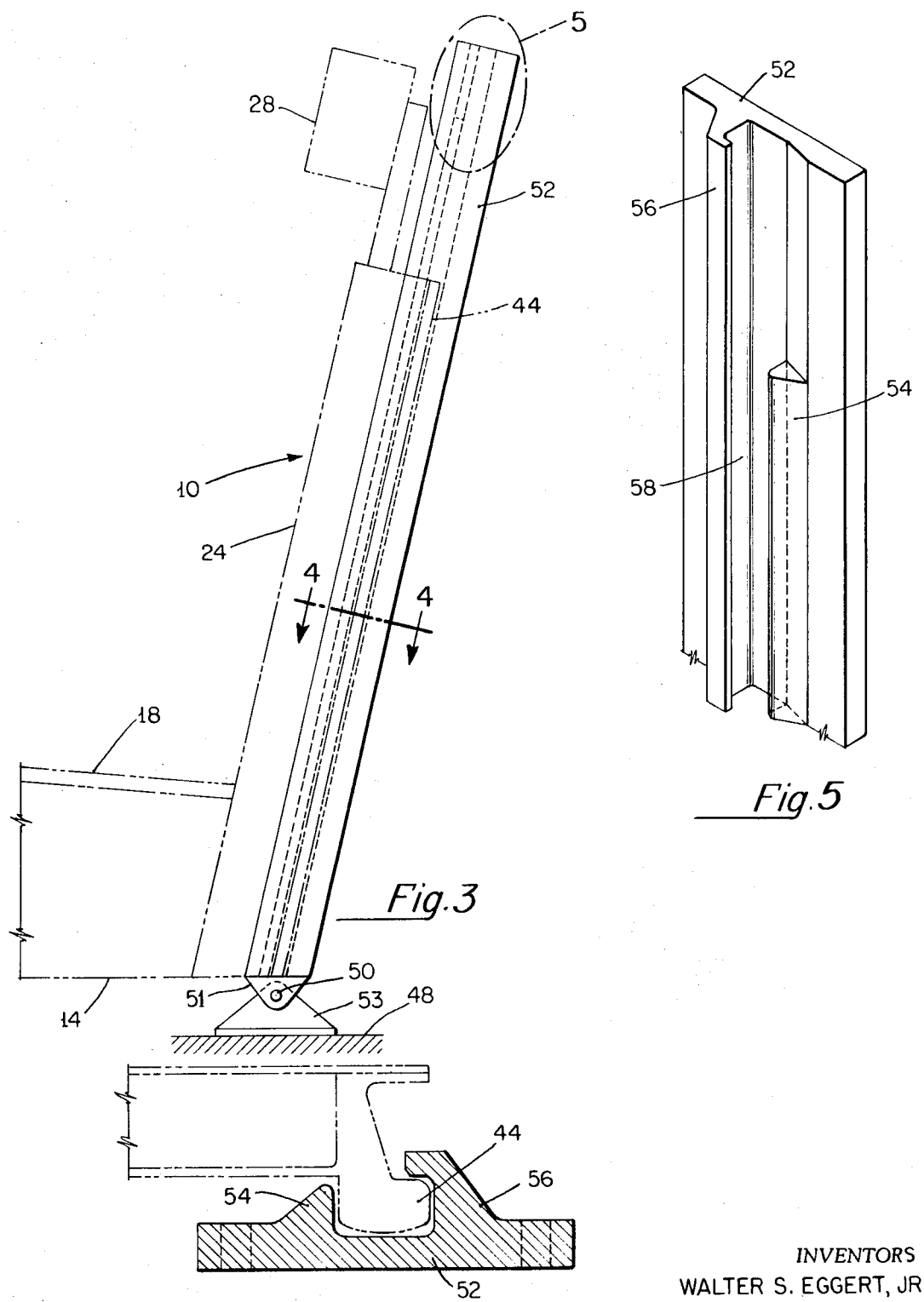

EJECTION SEAT ARRANGEMENT

Arrangements for removing an occupant or other load from a vehicle such as an aircraft are well known. In these cases, a man-carrying seat may be catapulted to a point of separation from the vehicle. A rocket or other means launches the man away from the vehicle. The rocket is effective to provide a stable trajectory over the total speed range of the vehicle. The seat and the man are maintained in their initial ejected position. After burn out of the propelling rocket, the seat and crew member soon reach the apogee of the ejection trajectory. At this time, the man separates from the seat and thereafter assumes normal parachute descent to the earth.

In the development of ejection seats, great emphasis has been placed on the actual structure of the seat to make it as light as possible while still maintaining high structural strength. Also, with the lightweight and high structural strength, it is desirable to have a seat which can accommodate a recovery parachute pack assembly, drogue packs or other items.

Various elements associated with the seat used heretofore have included roller elements associated with rails. When rollers are used, it is generally necessary to build up the structure adjacent the rollers. The reason for this is because of the high stress which is built up around the roller areas as the seat is being ejected. Other arrangements used heretofore have included the rail and track arrangements. However, these arrangements have generally involved short elements not related to guidance, with the main guidance of the seat being dependent upon the rocket power.

Rail and track arrangement provides means for distributing the stress of the seat during ejection operation. When the seat is ejected, however, the contact between the rail and track becomes less and less. This means that the stress on the smaller portions of rail and track become progressively greater as the seat is being ejected. Excessive stress on one point of the rail or track tends to produce distortion and possibly produce jamming during operation.

It is an object of this invention to provide an improved ejection seat.

It is a further object of this invention to provide an improved ejection seat with greater strength to weight ratio.

It is still a further object of this invention to provide an improved ejection seat of relatively high strength and relatively low weight, which is adapted to receive items required by a pilot after he is ejected from a vehicle.

In accordance with the present invention, an ejection seat arrangement for a vehicle includes an ejection seat having a main body including a honeycomb core sandwiched between formed metal sheets. The seat includes a horizontal seat support portion and a vertical back portion. A pair of elongated rail elements are secured to the sides of said back portion of the seat. A pair of track elements are secured to the floor of the vehicle. The rail and track elements operate in slidable relationship with each other so as to maintain the ejection seat along a straight path during an ejection operation. The tracks having cutaway areas towards their tops to cause the ejection seat to freely tilt just prior to the separation of the ejection seat from the vehicle.

Other objects and advantages of the present invention will be apparent and suggest themselves to those skilled in the art, from a reading of the following specification and claims, in conjunction with the accompanying drawing, in which:

FIG. 3 is a side view of a track in which the ejection seat of FIGS. 1 and 2 may be inserted;

FIG. 4 is a view taken along lines 4—4 of FIG. 3;

FIG. 5 is a portion of the top of the rail illustrated in the circle 5 of FIG. 3 with the view being an inside perspective view of the section illustrated in FIG. 3;

Figure 1:
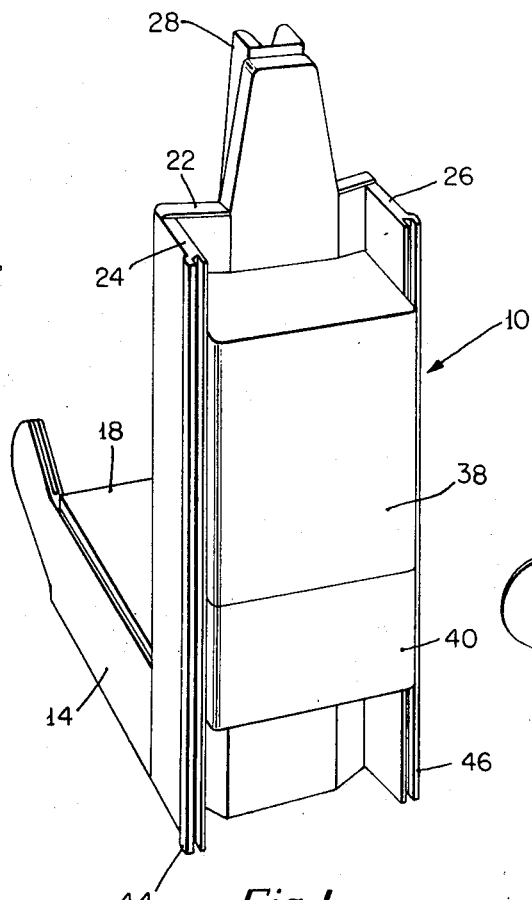
FIG. 1 is a rear perspective view of an ejection seat, in accordance with the present invention.
Figure 2:
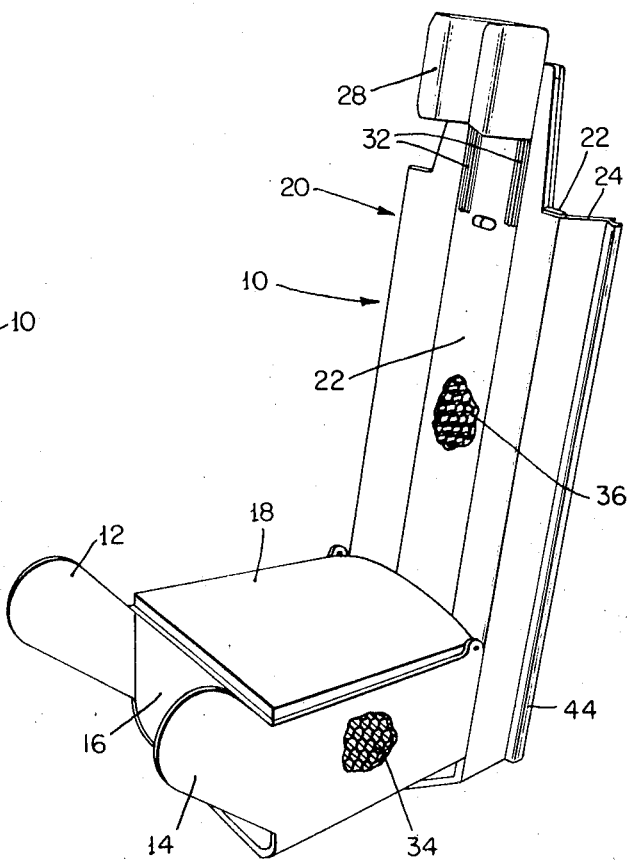
FIG. 2 is a front perspective view of an ejection seat in accordance with the present invention.

Referring to FIGS. 1 and 2 of the drawing, an ejection seat 10 includes a bottom seat support comprising side sections 12 and 14 and front section 16. A movable seat 18 is disposed to rest on the seat support members. A main vertical back support member 20 is suitably mounted to the side portions 12 and 14 by welding or other well-known means. The back member is shaped or contoured for a pilot.

The back support member 20 includes a central main portion 22 and two backwardly extending side portions 24 and 26. A headrest 28 adapted to be moved up and down in tracks 32 with the tracks being mounted to the central portion 22.

The main portions of the ejection seat 10 including the bottom portion and back portion include honeycomb cores 34 and 36. The honeycomb cores are sandwiched between sheets of formed metal. The honeycomb cores sandwiched between the formed metal pieces results in an extremely strong structure. The use of honeycomb structures for increased strength is known. The particular method for forming the honeycomb structure into the contour of the seat is described in a copending application of E. C. Almond entitled "Forming High Density Honeycomb Core" filed Apr. 9, 1970, Ser. No. 26,921 and assigned to the same assignee as the present invention.

The improved structural strength of the ejection seat 10 resulting from the use of honeycomb structures eliminates the need for braces between the backwardly extending side portions 24 and 26. This permits a relatively free space between the side portions in the back of the central seat portion. Consequently, there is convenient space to store a recovery parachute pack assembly 38 which may include a drogue package 40. Means for ejecting the seat which may include a rocket assembly is disposed on the bottom of the seat (not illustrated).

To the side members 24 and 26 include rail elements 44 and 46 respectively. As will be described, these rail elements are adapted to fit into a pair of track members to guide the ejection seat 10 during the initial stages of ejection.

Referring to FIGS. 3, 4 and 5, along with FIGS. 1 and 2, a pair of tracks are mounted mounting elements 53 attached to the floor 48. A pivot element 50 receives the extended portion 51 of the track to permit angular adjustment of the seat. Only one track 52 is illustrated, it being understood that a similar corresponding track is also used in the arrangement. The ejection seat 10 is shown in dotted lines with the rails of the seat adapted to ride in the tracks 52.

The track 52 includes a front portion 54 and a back portion 56 forming a groove 58 therebetween. The groove 58 is adapted to receive a rail 44. It is noted that both the rail elements of the seat and the track members extend upwardly a relatively long distance. When the ejection seat 10 is ejected by the operation of a rocket or other means, the stresses between the rail and track members are equally distributed. This is in contradistinction to roller arrangements where the stresses tend to build up at concentrated areas of contact between the rollers with the track. As the seat 10 is ejected, the areas of contact between the rails and the track become less and less. This results in a building up of stresses at progressively smaller areas.

In order to minimize the stresses at relatively small areas, the front portions 54 (only one being illustrated) are cut away towards their tops, as illustrated in FIG. 5. When the rails of the ejection seat 10 reach the cutaway portions of the front portions 54, the stresses will be relieved and the rear portions 56 of the tracks 52 will do the final guiding.

During ejection, the aircraft involved is generally going at a relatively high rate of speed. Consequently, when the ejection seat reaches the cutaway portion of the track, it will tend to tilt backwards and pivot about the top of the tracks 52.

Figure 6A:
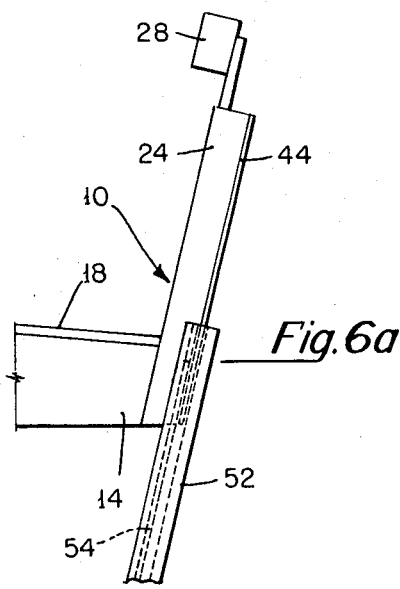
FIG. 6a is a view illustrating the ejection seat as it is being ejected from an aircraft.
Figure 6B:
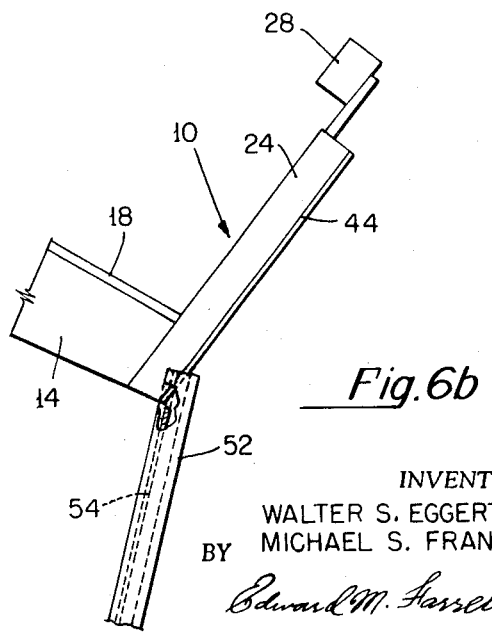
FIG. 6b illustrates the ejection seat just as it is about to leave the tracks, in accordance with the present invention.

Referring to FIG. 6a, the ejection seat 10 is illustrated partly up the track 52 during an ejection operation. In FIG. 6, the ejection seat 10 is illustrated in a tilted position as when the cutaway portion of the track is reached. Since there is no front portion to restrain the ejection seat 10, its bottom portion will tend to move forward with respect to the track 52. Thus, while some guidance is still provided by the track 52, the concentrated stress on the front portion of the track 52 is relieved. Following the tilting of the ejection seat 10 (not illustrated), the ejection seat 10 leaves the aircraft.

Following the separation of the ejection seat 10 from the aircraft the normal operations relating to the releasing of the drogue system and the parachute system take place. Eventually, the main portions of the seat 10 are separated from the pilot leaving only the seat portion 18 and necessary equipment with the pilot.

The present invention has provided an ejection seat of high structural strength. By so doing, it has enabled the seat to be built with increased storage space by eliminating the necessity of braces. Also, the arrangement involved in the present invention has made it possible to distribute the stress on the seat during an ejection operation, especially toward the final stage prior to separation of the seat from the vehicle.

What is claimed is:

1. An ejection seat arrangement for a vehicle comprising an ejection seat having a main body, said main body including a lightweight core sandwiched between formed metal sheets, said main body including a horizontal seat support portion and a vertical back portion extending upwardly from said seat support portion, a pair of elongated rail elements secured to the sides to said back portion of said seat, a pair of elongated track elements secured to said vehicle, said track elements extending upwardly from said vehicle in the same direction as said pair of rail elements and dimensioned to receive said rail elements therein, said rail and track elements operating in slidable relationship with each other to maintain said ejection seat along a predetermined path during an ejection operation, and said track elements having cut-away areas towards the tops thereof to cause said ejection seat to freely tilt prior to the separation of the ejection seat from the vehicle during an ejection operation.

2. The invention as set forth in claim 1 wherein said light weight core comprises an aluminum honeycomb core.

3. The invention as set forth in claim 2 wherein said back portion includes a main central portion with two backwardly extending side portions, with said rail elements being included along the longitudinal edges of said side portions.

4. The invention as set forth in claim 3 wherein said track elements include front and back elongated portions to form grooves therebetween to receive said rail elements.

5. The invention as set forth in claim 3 wherein the front portions of said tracks are cut away so that inertial forces exerted against the back portions of said tracks cause said seat to pivot about the tops of said track elements prior to leaving said vehicle during an ejection operation.

6. The invention as set forth in claim 5 wherein said tracks extend upwardly a distance beyond the lengths of said rail elements.

* * * * *